United States Patent
Council, Jr. et al.

(10) Patent No.: US 6,315,650 B1
(45) Date of Patent: Nov. 13, 2001

(54) METHOD FOR LATHING A LENS

(75) Inventors: Buford W. Council, Jr., Ruskin; Lorenzo J. Salvatori, Lutz; Philip D. Goller, Bradenton; Wayne R. Manning, Sarasota, all of FL (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/346,825

(22) Filed: Jul. 2, 1999

Related U.S. Application Data

(62) Division of application No. 09/146,366, filed on Sep. 9, 1998, now Pat. No. 5,931,068.

(51) Int. Cl.⁷ .................................................. B24B 41/06
(52) U.S. Cl. .......................... 451/384; 451/390; 451/460
(58) Field of Search .................................. 451/390, 384, 451/460, 364, 389; 269/268, 283

(56) References Cited

U.S. PATENT DOCUMENTS

| | | | | |
|---|---|---|---|---|
| 1,467,308 | * | 9/1923 | Clement et al. ...................... | 451/460 |
| 1,487,024 | * | 3/1924 | Robinson ................................ | 451/364 |
| 2,441,472 | * | 5/1948 | D'Avaucourt ........................ | 451/390 |
| 3,030,745 | | 4/1962 | Freeman ................................. | 51/284 |
| 3,152,427 | * | 10/1964 | Prunier ................................. | 451/460 |
| 3,404,488 | * | 10/1968 | Cox et al. ............................. | 451/460 |
| 3,466,813 | * | 9/1969 | Leibowitz ............................. | 451/389 |
| 3,996,701 | * | 12/1976 | Ramirez et al. ...................... | 451/460 |
| 4,085,553 | * | 4/1978 | Prunier ................................. | 451/390 |
| 4,202,848 | | 5/1980 | Neefe ...................................... | 82/18 |
| 4,455,901 | | 6/1984 | Council, Jr. ........................... | 82/12 |
| 4,502,909 | | 3/1985 | Tomesko et al. ..................... | 156/356 |
| 4,681,295 | | 7/1987 | Haardt et al. .......................... | 82/1 C |
| 4,924,739 | | 5/1990 | Ademovic ............................. | 82/1.11 |
| 5,085,013 | * | 2/1992 | Ascosi et al. ........................ | 451/460 |
| 5,145,884 | | 9/1992 | Yamamoto ............................ | 522/14 |
| 5,740,707 | | 4/1998 | Svochak et al. ...................... | 82/1.11 |
| 5,800,255 | | 9/1998 | Hyslop et al. ........................ | 82/1.11 |
| 6,126,528 | * | 10/2000 | Sedlock ............................... | 451/390 |

FOREIGN PATENT DOCUMENTS

| | | |
|---|---|---|
| 0661134A1 | 12/1994 | (EP) . |
| 9402125A | 12/1994 | (NL) . |

OTHER PUBLICATIONS

Patent Abstracts of Japan vol. 010, No. 037 (M–453) Feb. 14, 1986 & JP 60 191702 A (Matsushita Denki Sangyo KK) Sep. 30, 1985 abstract .

* cited by examiner

Primary Examiner—Joseph J. Hail, III
Assistant Examiner—George Nguyen
(74) Attorney, Agent, or Firm—John E. Thomas

(57) ABSTRACT

A method of lathing a lens, especially a contact lens, involves attaching the cylindrical blank of lens material to a first block of machineable plastic material, lathe cutting a desired first lens surface in the cylindrical blank, attaching the machined first lens surface of the blank to a second block, lathe cutting to remove the block of machineable plastic material, and lathe cutting a desired second lens surface in the blank. Both the first and second blocks may be adhered to the lens blank with an adhesive curable by ultraviolet radiation, and a two-piece block, composed of a head section and a body section, is disclosed.

4 Claims, 2 Drawing Sheets

METHOD FOR LATHING A LENS

This is a divisional of application Ser. No. 09/146,366 filed on Sep. 9, 1998, now U.S. Pat. No. 5,931,068.

BACKGROUND OF THE INVENTION

The present invention relates to improved methods and apparatus for lathe cutting lenses, especially contact lenses, from a blank or button.

A conventional method of manufacturing lenses, especially contact lenses, involves lathing the lens from a cylindrical blank of polymerized lens material (such cylindrical blanks commonly referred to as a "button"). The buttons may be cut initially from rod stock or sheets, or individually cast in cups using a curable liquid monomeric composition.

While it is possible in some cases to insert the button directly into the lathe collet, it is more typical to first attach the button to a separate metal pin or "block", the opposite end of the block being configured for removable insertion into the collet of the lathe. The button is typically adhered to the block with an adhesive or special type of wax called "pitch" (with the block thus commonly referred to as a "pitch block" in the art). While the block and button are turned, the desired concave (or "base") curve is lathed into the exposed end of the button opposite the adhered end. Subsequently, this semi-finished button is deblocked from this first base curve metal block, for example, by removing the pitch adhering the button to the metal block.

Then, this partially-finished button is adhered to a second metal block such that the lathe cut base curve of the button is adhered to the second metal block, again typically with pitch, while attempting to maintain proper alignment vis-a-vis the second metal block and the cut base curve. This front curve metal block is mounted to a lathe collet for lathing the convex (or "front") curve from the button. Subsequently, the lens must be deblocked from the front curve metal block.

These operations may also involve intermediate lathing operations, for example, cutting a desired precision thickness or cutting an edge chamfer in the button, prior to lathing the front curve. Also, typically these operations will involve lens edging and polishing operations on the lathe cut surfaces.

The multiple mounting and removal operations of the button to and from the blocks during the overall lathing process consume a significant amount of time and are prone to error, especially in maintaining the necessary axial alignment between the base curve block and the front curve block. Also, deblocking of the button or lens from the metal blocks to remove pitch requires the undesirable use of solvents or liquid suspension media as well as adds to the manufacturing cycle time.

SUMMARY OF THE INVENTION

This invention provides an improved method of lathing a lens, especially a contact lens, from a cylindrical blank. According to a first embodiment, the method comprises: attaching the cylindrical blank of lens material to a block of machineable plastic material; mounting the block in a lathe collet and lathe cutting a desired first lens surface in the cylindrical blank; attaching the machined first lens surface of the blank to a second block while the blank remains adhered to the block of machinable plastic material; mounting the second block in a lathe collet, and lathe cutting to remove the block of machineable plastic material; and lathe cutting a desired second lens surface, opposite the first lens surface, in the blank.

According to various preferred embodiments, both the first block of machineable plastic material and the second block are adhered to the lens blank with an adhesive curable by ultraviolet radiation.

According to various other preferred embodiments, the second block is composed of a head section and a body section, the head section comprising a convex upper surface for adhering to the concave base curve of the blank, and the body section comprising an elongated cylindrical body. A lower portion of the head section is releasably securable in an upper portion of the body section. The body section can be separated from the head section with the lens being retained on the head section, with the body section being recycled for additional cycles. Subsequently, the lens can be separated from the head section of this second block, for example, by immersion in a heated aqueous bath.

The invention also provides a method of preparing a cylindrical blank of lens material for lathe cutting a lens therefrom comprising attaching to the lens blank a block of plastic material with an adhesive curable by ultraviolet radiation, said block being transparent to ultraviolet radiation, and transmitting ultraviolet radiation through the block to cure the adhesive; and, following lathe cutting a desired first lens surface in the blank, attaching to the cut first lens surface of the blank a second block of plastic material with an adhesive curable by ultraviolet radiation, said second block being transparent to ultraviolet radiation, and transmitting ultraviolet radiation through this second block to cure the adhesive.

The invention permits precise axial alignment of the second block with respect to the lens blank having a first curve lathe cut therein. Additionally, the invention avoids deblocking operations that require a solvent and are more time intensive.

DETAILED DESCRIPTION OF VARIOUS PREFERRED EMBODIMENTS

Figure 1:
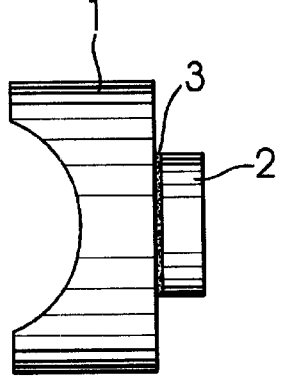
FIG. 1 is a side view of a contact lens blank and first block according to preferred embodiments of this invention.

Referring now to the drawing figures, FIG. 1 illustrates cylindrical blank 1 of lens material. Such cylindrical blanks for lathing contact lenses are commonly referred to as "buttons". The cylindrical blanks may be cut initially from rod stock or sheets of material, or individually cast in cups, from a curable monomeric composition. For the illustrated embodiment involving lathing of contact lenses, blank 1 will typically have a diameter of about 10 to 18 mm.

Attached to blank 1 is first block 2. For the described preferred embodiment, first block 2 is composed of a transparent, machineable plastic material. First block 2 is intended for insertion in the collet of a lathe for lathing a first lens surface in blank 1. It is possible that this first block could be formed as an integral part of the blank, i.e., first block and the blank would be molded from the same material as an integral, one-piece article. However, it was found that in such cases, compression forces on the first block, when mounted in the lathe collet, have a tendency to distort the blank portion thus affecting the precision of subsequent lathe cutting operations. Thus, it is preferred that first block 2 is a separate article from blank 1, a suitable material being polymethylmethacrylate or copolymers thereof.

As seen in FIG. 1, first block 2 may merely have the shape of a cylindrical disk. As discussed below, ultimately, first block 2 will be removed from blank 1 by lathe cutting away block 2. Accordingly, the size of block 2 should be selected so that it has sufficient surface area for mounting in the lathe collet, but excess bulk should be avoided to avoid inefficiencies and excess time required to lathe away the block. A suitable size is a cylindrical disk having a diameter of about 6 to 10 mm and a height (or thickness) of about 2 to 5 mm, more appropriately a diameter of about 8 mm and a height of about 2.5 mm.

According to preferred embodiments, block 2 is adhered to blank 1 with an adhesive 3 curable by exposure to ultraviolet (UV) radiation. Accordingly, a metered amount of liquid adhesive may be applied to the blank, block 2 is then applied to the adhesive and blank, and while maintaining a compressive force UV radiation is directed to cure the adhesive. It is preferred that block 2 is transparent and that the UV radiation is directed through the block rather than directed through the blank, as it is possible that such exposure of the blank to UV radiation could undesirably alter properties of the polymeric material constituting the blank. And since UV-curable adhesives absorb UV radiation, this arrangement ensures the blank is exposed to minimal UV radiation. The adhesive should be selected such that it has sufficient strength to withstand compressive and shear forces in subsequent processing steps. A suitable adhesive is available under the tradename Loctite 363 from Loctite Corporation.

Figure 2:
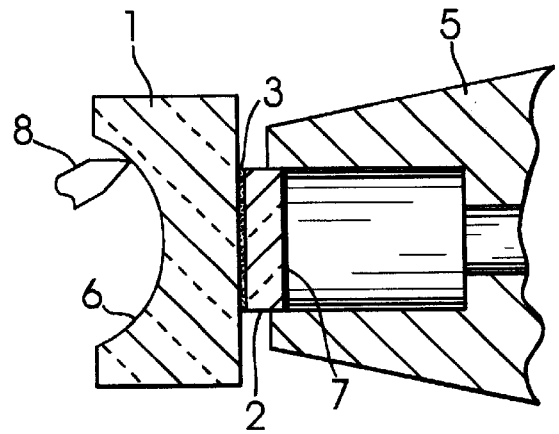
FIG. 2 is a side, cross-sectional view of the blank and first block of FIG. 1 mounted in a lathe collet.
Figure 3:
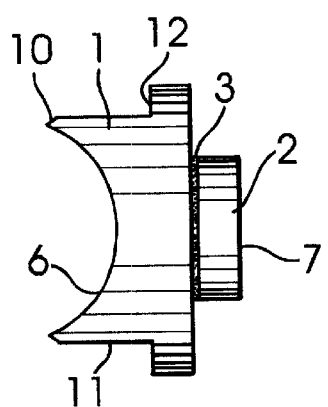
FIG. 3 is a side view of the blank and first block following lathing operations of FIG. 2.

As illustrated in FIG. 2, block 2 is mounted in lathe collet 5, and a first desired lens surface 6 is lathe cut in blank 1 via cutting tool 8. For the illustrated embodiment, lens surface 6 is a concave, base curve surface (although it is within the scope of aspects of the invention for this initial lathing operation to involving cutting the convex, front curve lens surface). While the blank and block are mounted in the lathe collet, additional cuts can be made to blank 1. For example, the periphery 10 of blank 1 can be cut to the desired final lens diameter and a second peripheral cut can be made to form a blocking diameter 11 and blocking shoulder 12 so that the blank assumes a shape along the lines of FIG. 3. For the illustrated embodiment where lens surface 6 is a concave, base curve surface, it is preferred that the lathe collet includes a dead-stop collet. More specifically, surface 7 of block 2 abuts an internal stop in the lathe collet, thus permitting precise control of the depth of the base curve cut, i.e., the thickness 13 of the blank (measured from surface 7 to the apex of curve 6, as shown in FIG. 3) following the base curve cut is precisely known for subsequent lathing operations. Typically, thickness 13 will range from about 4 to 8 mm, more typically about 4 to 6 mm.

Following this lathing operation, surface 6 can be polished, if desired or necessary, to a desired final optical quality finish. In the case where the lathe cutting of surface 6 is relatively higher quality, a dry polishing operation can be performed, for example, using a polishing pad with an polishing agent such as aluminum oxide incorporated therein. In the case where the lathe cutting is of relatively lower quality, a more vigorous polishing operation can be performed, for example, a wet polishing operation using a polishing agent such as aluminum oxide suspended in a silicone oil. It is preferred to use a dry polishing operation.

Figure 4:
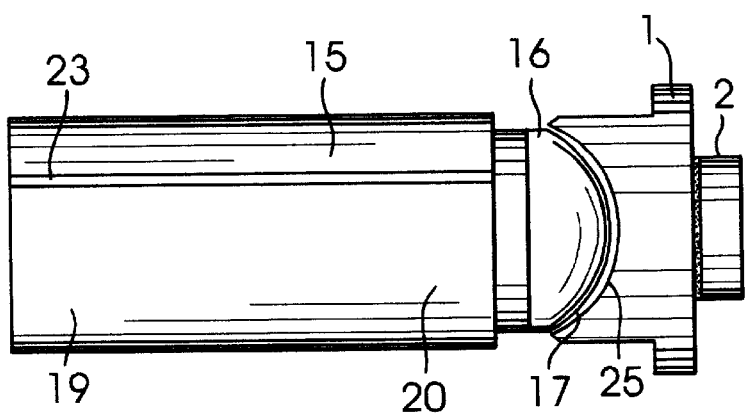
FIG. 4 is a side view of the blank and first block of FIG. 3 attached to a second block according to preferred embodiments of the invention.
Figure 5:
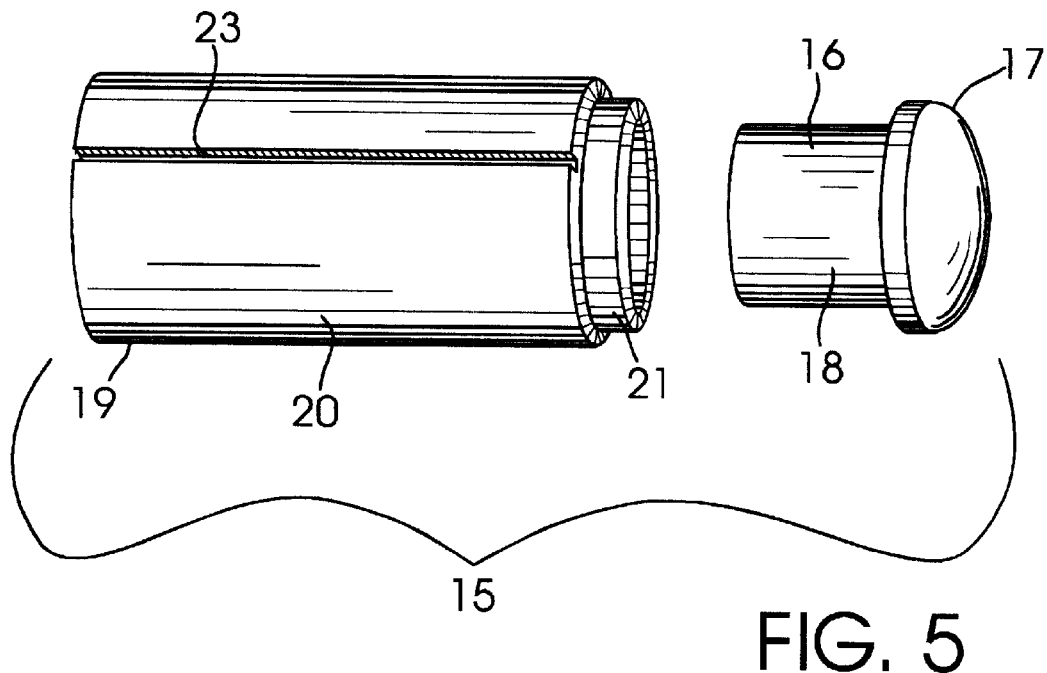
FIG. 5 is an exploded, elevational view of the second block of FIG. 4.

As seen in FIG. 4, blank 1 is now mounted to second block 15. According to preferred embodiments, and further illustrated in FIG. 5, block 15 is composed of two pieces, head section 16 comprising convex upper surface 17 extending from cylindrical body 18, and body section 19 comprising an elongated cylindrical body 20, these two pieces being releasably securable to each other. For example, the lower portion 18 of the head section may be tapered providing an interference fit with a corresponding taper of the upper portion 21 of the body section. Body section 19 may include a longitudinal slot 23 for alignment with a lathe collet for lathing operations discussed below. A suitable material for head section 16 is polymethylmethacrylate or copolymers thereof, and a suitable material for body section 19 is polycarbonate or copolymers thereof, polycarbonate having a slight resiliency for accepting and holding lower portion 18 of the head section.

Similar to the mounting of the first block, it is preferred that the second block 15 is adhered to the lens blank with a UV-curable adhesive 25. For this blocking procedure, it is important that the block 15 is properly aligned with respect to the blank. More specifically, both blank 1 with first block 2 still attached thereto, as well as block 15, should be maintained in alignment with respect to one another while adhesive 25 is cured therebetween to adhere these two pieces. An illustrative procedure is as follows.

Blank 1 is preferably supported vertically so that surface 6 of the blank is in the upward position. For example, first block 2 may nest in a support and retained against this support by applying a vacuum. Block 15 can be retained in a metallic tube such that surface 17 is in the downward position and the tube has a slightly larger inside diameter than the largest outside diameter of block 15. By supplying compressed air evenly around block 15 to effect an air bearing, block 15 can be made to center within the tube. A metered amount of liquid adhesive is applied to surface 6 of the blank, and the blank is lifted vertically by its support so that adhesive 25 contacts surface 17 of block 15 held in the tube. While waiting a few seconds for the adhesive to flow into a uniform film between surfaces 6 and 17, the air bearing in the tube is activated to center block 15. Then, UV radiation is directed to cure the adhesive. It is noted that such a procedure serves to center the blank and block 15 with respect to one another, as well as to avoid axial tilt between the two pieces. It is again preferred that block 15 is transparent and that the UV radiation is directed through the block rather than directed through the blank, so as to avoid exposing the blank to UV radiation. The adhesive should be selected such that it has sufficient strength to withstand compressive and shear forces in subsequent processing steps, however, the adhesive should be selected so that the lens can be removed from the adhesive in subsequent operations. A suitable adhesive is available under the tradename Loctite 3751 from Loctite Corporation.

Figure 6:
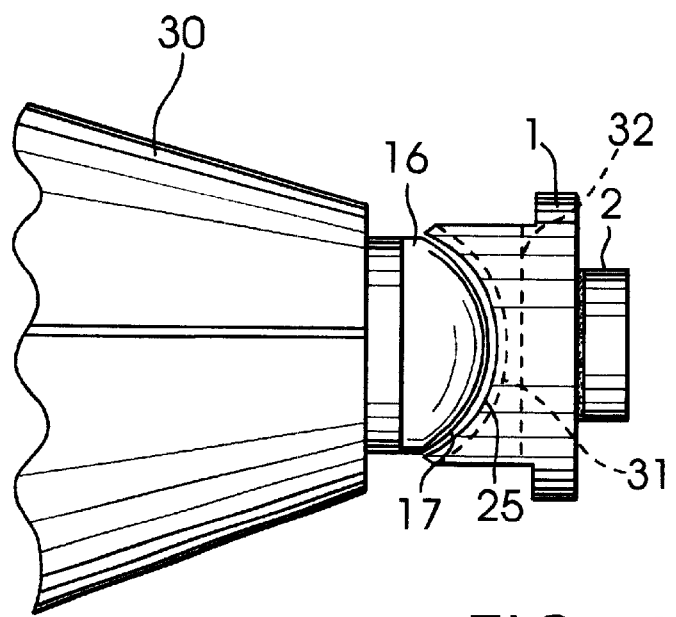
FIG. 6 is a side view of the assembly of FIG. 4 mounted in a lathe collet.

Body section 19 is inserted in the collet 30 of a lathe for lathing a second lens surface in blank 1. Prior to machining the desired second lens surface of the blank (opposed to surface 6), first block 2 is lathe cut away as shown schematically in FIG. 6; it may also be desired to reduce the overall thickness of blank 1 to a predetermined thickness with the cutting head of the lathe during this cut. Also, at this point, a chamfer cut (not shown in FIG. 6) can then be made in the periphery of the lens, for example, in the case where the final front, convex surface of the lens will include a curve peripheral to the central optical zone or when this front lens surface has a toric central optical zone and a ballasted peripheral zone. Collet 30 can be designed to receive alignment slot 23 of body section, so that in the case that a rotationally asymmetric surface or a surface offset from the center of the blank is being cut, the rotational position of the blank can be controlled in combination with the position of the lathe cutting head. It is noted that the removal of second block 2 by a lathing operation eliminates time-consuming deblocking methods required for prior methods involving a metal block.

Now, the blank is ready for lathing the final desired lens surface, which, for the described embodiment, is the convex front lens surface. This cut is shown schematically by dashed line 31 in FIG. 6. (In the case where the initial lathed lens surface was the convex, front curve, the head section of second block may include a concave upper surface for adhering to the convex lens surface.) Second block 15 can remain in collet 30 for this operation, or second block 15 can be mounted in the collet of another lathe set-up for this operation. It is noted that slot 23 again may be used to register the rotational position of the blank with respect to the lathe collet, especially where this final lathing operation involves cutting a rotationally asymmetric curve such as a toric surface.

Following this lathing operation, the convex surface of the lens can be polished to a desired final optical quality finish, as well as rounding of the front peripheral edge of the lens, if desired or necessary. As mentioned previously, in the case where the lathe cutting is relatively higher quality, the aforementioned dry polishing operation can be performed; in the case where the lathe cutting is of relatively lower quality, a more vigorous polishing operation can be performed, for example, a wet polishing operation. Any such edging or polishing operations can be performed while second block remains inserted in the lathe collet, or alternately, second block can be inserted in a spindle of the edger/polisher. It is especially preferred to use a dry polishing operation to avoid the need to use solvents or liquid suspension media for cleaning residuals from wet polishing of the lens.

The final stages of the process involve separating the finished lens from block 15. According to the described preferred embodiments, first, body section 19 is removed from head section 16 with the lens remaining adhered to the head section. This can be done by gripping the body section, for example, in a collet, and inserting a plunger through elongated cylindrical body 20, the plunger contacting head section 16 to disengage head section 16 from body section 19. The body section can be recovered for reuse in subsequent operations if desired. Then, the lens is removed from the head section. This is preferably accomplished by immersing the lens and head section in a heated bath, for example, in a heated saline solution where the lens is extracted and hydrated. Soft hydrogel lens materials typically swell upon hydration, and it has been found that such swelling of the lens, and the fact that the adhesive bond is stronger to the block than to the lens, is adequate to release the lens from the adhesive and head section without damaging the lens. For this operation, the block and lens can be retained in a basket when immersed in the bath so as to facilitate recovery of the lens once released from the second block. The second block can be discarded. It is noted that this deblocking operation is less labor intensive than prior methods involving lens blanks adhered to a block with pitch, while also avoiding the need for solvents or liquid suspension media to remove the pitch. Further, it is noted that, in the case a dry polishing operation has been used to polish the lens surface, any residues from this dry polishing operation will be washed from the lens during the extraction and hydration, thereby further avoiding the need for a solvent or a liquid medium to clean such residues from the lens.

Following recovery of the lens, the lens can be subjected to conventional post-lathing operations, such as inspection and packaging.

The above-described preferred embodiment relates primarily to methods involving lathing a contact lens button having an initial cylindrical shape. However, aspects of the invention involving the second block of the invention are also applicable to methods involving a semi-finished contact lens blank, i.e., methods where the initial contact lens blank has one molded-in lens surface, and subsequently the opposite surface of the button and periphery are lathe cut while this semi-finished blank is mounted to the described second block, to obtain an article with a final contact lens shape. Various other alternate embodiments and variations of the present invention will be evident to one skilled in the art.

What is claimed is:

1. An article comprising:

a block for attachment to a contact lens blank having a concave, base curve surface, the block comprising a head section and a body section, the head section comprising a convex upper surface for adhering to the concave base curve of the blank with an adhesive curable by ultraviolet radiation, the body section comprising an elongated cylindrical body, and a lower portion of the head section being releasably securable in an upper portion of the body section, wherein the head section and the body section are transparent to ultraviolet radiation directed through the block to cure the adhesive.

2. The article of claim 1, wherein the lower portion of the head section is tapered providing an interference fit with a corresponding tapered section on the upper portion of the body section.

3. The article of claim 2, wherein the tapered lower portion of the head section is received in the corresponding tapered section of the body section upper portion.

4. The article of claim 1, wherein the elongated cylindrical body of the body section includes a longitudinal slot.

* * * * *